(12) United States Patent
Tamamura

(10) Patent No.: US 7,102,787 B2
(45) Date of Patent: Sep. 5, 2006

(54) IMAGE READING APPARATUS

(75) Inventor: Katsuki Tamamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1016 days.

(21) Appl. No.: 10/143,834

(22) Filed: May 14, 2002

(65) Prior Publication Data

US 2002/0191229 A1 Dec. 19, 2002

(30) Foreign Application Priority Data

May 14, 2001 (JP) .............................. 2001-142727

(51) Int. Cl.
G06K 15/00 (2006.01)
H04N 1/46 (2006.01)

(52) U.S. Cl. ..................... 358/3.01; 358/516; 358/521; 358/529; 358/530

(58) Field of Classification Search ................ 382/169, 382/274; 358/3.01, 3.02, 515, 516, 517, 358/518, 521, 529
See application file for complete search history.

(56) References Cited

U.S. PATENT DOCUMENTS 5,581,359 A * 12/1996 Kaburagi et al. ........... 358/518
5,852,817 A * 12/1998 Kano .......................... 706/23
6,325,482 B1 * 12/2001 Hayasaki et al. ............ 347/19

FOREIGN PATENT DOCUMENTS

JP          62-40873 A      2/1987
JP          2-202772 A      8/1990
JP          6-245065 A      9/1994
JP          7-264400       10/1995
JP          8-98022 A       4/1996
JP          9-247445        9/1997
JP          11-215372 A     8/1999

* cited by examiner

Primary Examiner—Jerome Grant, II
(74) Attorney, Agent, or Firm—Foley & Lardner LLP

(57) ABSTRACT

An image reading apparatus comprises a correction coefficient determining circuit 4 for determining a correction coefficient per each bit of white reference data in a main scanning direction which are read immediately before reading an original image, a correction coefficient modifying circuit 5 for producing a modified correction coefficient, and a correction coefficient predicting circuit 6 for producing a predicted correction coefficient with reference to the modified correction coefficient. If an absolute value of a difference between the correction coefficient and the predicted correction coefficient is smaller than and not smaller than a predetermined threshold value, the correction coefficient modifying circuit 5 produces the correction coefficient and the predicted correction coefficient as the modified correction coefficient respectively. A correction coefficient memorizing circuit 7 memorizes the modified correction coefficient as shading correction coefficient data. The correction coefficient predicting circuit 6 produces the predicted correction coefficient for a particular bit of the white reference data in the main scanning direction with reference to at least a preceding adjacent bit preceding the particular bit in the main scanning direction.

6 Claims, 3 Drawing Sheets

IMAGE READING APPARATUS

BACKGROUND OF THE INVENTION

This invention relates to an image reading apparatus for use in a facsimile machine, a copying machine, and the like.

In an image reading apparatus for use in a facsimile machine and a copying machine, a white reference as a reference of an image density is read by the use of a white reference plate before reading an original image. In presence of dust or dirt on the white reference plate, a shading correction waveform becomes abnormal. In this event, a white line is inevitably produced when the original image is read.

In order to solve the above-mentioned problem, proposal is made of a shading correction circuit disclosed in Japanese Unexamined Patent Publication No. H07-264400 (JP 7-264400A) which will hereinafter be referred to as a first conventional technique.

Referring to FIG. 1, the shading correction circuit according to the first conventional technique comprises an image sensor 1 for reading an original image to produce analog image data, an A/D (analog to digital) converter 2 connected to the image sensor 1 for converting the analog image data into digital image data, and a switch 3 connected to the A/D converter 2. Upon factory shipment, initial shading waveform data are acquired. Specifically, the image sensor 1 reads a white reference plate as a white reference to produce analog white reference data. The A/D converter 2 converts the analog white reference data into digital white reference data. Through the switch 3, the digital white reference data are supplied to a correction coefficient converting circuit 4 to be converted into a first correction coefficient per each bit in a main scanning direction. The first correction coefficient is sent from the correction coefficient converting circuit 4 through a switch 15 to a first correction coefficient memorizing circuit 16 to be memorized therein. Immediately before reading an original image, the white reference plate is similarly read so that a second correction coefficient is obtained by the correction coefficient converting circuit 4. The second correction coefficient is sent through the switch 15 to a second correction coefficient memorizing circuit 17 to be memorized therein. Supplied with the first and the second correction coefficients memorized in the first and the second correction coefficient memorizing circuits 16 and 17, a white reference contamination judging circuit 18 compares, per each bit, a difference between the first and the second correction coefficients with a predetermined threshold value to judge presence/absence of contamination of the white reference. If the difference between the first and the second correction coefficients is not greater than the threshold value and the white reference therefore includes no contamination, a correction coefficient calculating circuit 19 updates the content (i.e., the first correction coefficient) of the first correction coefficient memorizing circuit 16 with the content (i.e., the second correction coefficient) of the second correction coefficient memorizing circuit 17. On the other hand, if the difference between the first and the second correction coefficients is greater than the threshold value and the white reference therefore includes some contamination with respect to a particular bit, the correction coefficient calculating circuit 19 updates the content (i.e., the first correction coefficient) of the first correction coefficient memorizing circuit 16 with reference to the first and the second correction coefficients memorized in the first and the second correction coefficient memorizing circuits 16 and 17 for an uncontaminated adjacent bit and the first correction coefficient memorized in the first correction coefficient memorizing circuit 16 for the particular bit. Upon reading an original image, a correction coefficient multiplying circuit 8 multiplies digital image data as an output of the A/D converter 2 by the first correction coefficient memorized in the first correction coefficient memorizing circuit 16. In FIG. 1, a reference numeral 20 represents a correction coefficient ratio memorizing circuit.

As described above, the first conventional technique requires the two correction coefficient memorizing circuits 16 and 17 in order to detect the contamination of the white reference. The first correction coefficient memorizing circuit 16 memorizes the first correction coefficient obtained upon the factory shipment of an apparatus comprising the shading correction circuit. The second correction coefficient memorizing circuit 17 memorizes the second correction coefficient obtained immediately before reading the original image. By comparing the difference between the first and the second correction coefficients memorized in the first and the second correction coefficient memorizing circuit 16 and 17 with the threshold value, judgment is made of presence/absence of the contamination of the white reference. In absence of the contamination of the white reference, the content (i.e., the first correction coefficient) of the first correction coefficient memorizing circuit 16 is updated by the content (i.e., the second correction coefficient) of the second correction coefficient memorizing circuit 17. In presence of the contamination of the white reference, the content (i.e., the first correction coefficient) of the first correction coefficient memorizing circuit 16 is updated with reference to the first and the second correction coefficients memorized in the first and the second correction coefficient memorizing circuits 16 and 17 for the uncontaminated adjacent bit and the first correction coefficient memorized in the first correction coefficient memorizing circuit 16 for the particular bit.

In the first conventional technique, however, the first correction coefficient is updated into a new value one after another by the use of a previous value of the first correction coefficient and the second correction coefficient obtained immediately before reading the original image. Therefore, once an incorrect value is memorized due to signal noise or misjudgment upon the contamination of the white reference, the first correction coefficient is continuously updated into an incorrect new value thereafter. The white reference is at first acquired upon the factory shipment. Therefore, in case where dust is attached to the white reference plate itself in a production process, correction is impossible. Such white reference plate can not be used because it is defective. This deteriorates the yield of production of the white reference plate.

As a second conventional technique, proposal has been made of an image reading apparatus disclosed in Japanese Unexamined Patent Publication No. H09-247445 (JP 9-247445 A). The second conventional technique describes that generation of an unnecessary line in an acquired image in presence of dust attached to a first mirror close to a surface of an original image is prevented by shading correction like in the first conventional technique. In the second conventional technique, correction is carried out when reading a multi-value image by comparing white reference data upon shading correction and image data upon reading the image. Therefore, in case where the white reference itself includes dust or dirt, a corresponding bit can not be corrected. Thus, according to the second conventional technique, correction is possible if the dust is attached to the mirror but is impossible if the white reference plate itself is contaminated.

Fine dust on the white reference plate is inevitable in its production process. If the resolution of the image reading apparatus is improved, such fine dust is read and manifested or expressed as a white line in image information.

SUMMARY OF THE INVENTION

It is therefore an object of this invention to provide an image reading apparatus capable of modifying an abnormality in a shading correction waveform to continuously execute appropriate correction even if dust or dirt is present on a white reference plate so that a normal picture quality without a white line is assured.

It is another object of this invention to provide an image reading apparatus comprising means for analyzing a correction coefficient obtained immediately before reading an original image to detect dust or dirt on a white reference plate and modifying the correction coefficient, without using a previous correction coefficient.

It is still another object of this invention to provide a method of accurately obtaining shading correction coefficient data in an image reading apparatus comprising an image reader for reading an original image to produce digital image data, a correction coefficient memorizing circuit for memorizing the shading correction coefficient data, and a correction coefficient multiplying circuit connected to the correction coefficient memorizing circuit for multiplying the digital image data by the shading correction coefficient data to produce a result of multiplication as shading corrected image data.

According to a first aspect of this invention, there is provided an image reading apparatus comprising an image reader for reading an original image to produce digital image data, a correction coefficient memorizing circuit for memorizing shading correction coefficient data, and a correction coefficient multiplying circuit connected to the correction coefficient memorizing circuit for multiplying the digital image data by the shading correction coefficient data to produce a result of multiplication as shading corrected image data, the image reading apparatus further comprising:

a correction coefficient determining circuit responsive to white reference data of a white reference plate read by the image reader before reading the original image for determining a correction coefficient per each bit of the white reference data in a bit array along a main scanning direction;

a correction coefficient modifying circuit connected to the correction coefficient determining circuit for producing a modified correction coefficient; and a correction coefficient predicting circuit connected to the correction coefficient modifying circuit for producing a predicted correction coefficient with reference to the modified correction coefficient and sending the predicted correction coefficient to the correction coefficient modifying circuit;

the correction coefficient modifying circuit being supplied with the correction coefficient and the predicted correction coefficient and producing the correction coefficient and the predicted correction coefficient as the modified correction coefficient when an absolute value of a difference between the correction coefficient and the predicted correction coefficient is smaller than and is not smaller than a predetermined threshold value, respectively;

the correction coefficient memorizing circuit memorizing the modified correction coefficient as the shading correction coefficient data.

According to a second aspect of this invention, there is provided the image reading apparatus according to the first aspect, wherein:

the correction coefficient predicting circuit obtains the predicted correction coefficient for a particular bit of the white reference data in the bit array along the main scanning direction with reference to at least a preceding adjacent bit preceding the particular bit in the main scanning direction.

According to a third aspect of this invention, there is provided the image reading apparatus according to the first aspect, wherein:

the image reader comprises an image sensor and an A/D converter connected to the image sensor.

According to a fourth aspect of this invention, there is provided a method of obtaining shading correction coefficient data in an image reading apparatus comprising an image reader for reading an original image to produce digital image data, a correction coefficient memorizing circuit for memorizing the shading correction coefficient data, and a correction coefficient multiplying circuit connected to the correction coefficient memorizing circuit for multiplying the digital image data by the shading correction coefficient data to produce a result of multiplication as shading corrected image data, the method comprising the steps of:

a correction coefficient determining step of determining, in response to white reference data of a white reference plate read by the image reader before reading the original image, a correction coefficient per each bit of the white reference data in a bit array along a main scanning direction;

a correction coefficient modifying step of receiving the correction coefficient and producing a modified correction coefficient; and a correction coefficient predicting step of producing a predicted correction coefficient with reference to the modified correction coefficient;

the correction coefficient modifying step receiving the correction coefficient and the predicted correction coefficient and producing the correction coefficient and the predicted correction coefficient as the modified correction coefficient when an absolute value of a difference between the correction coefficient and the predicted correction coefficient is smaller than and is not smaller than a predetermined threshold value, respectively;

the method further comprising the step of making the correction coefficient memorizing circuit memorize the modified correction coefficient as the shading correction coefficient data.

According to a fifth aspect of this invention, there is provided the method according to the fourth aspect, wherein:

the correction coefficient predicting step obtains the predicted correction coefficient for a particular bit of the white reference data in the bit array along the main scanning direction with reference to at least a preceding adjacent bit preceding the particular bit in the main scanning direction.

According to a sixth aspect of this invention, there is provided the method according to the fourth aspect, wherein:

the image reader comprises an image sensor and an A/D converter connected to the image sensor.

DESCRIPTION OF THE PREFERRED EMBODIMENT

Figure 1:
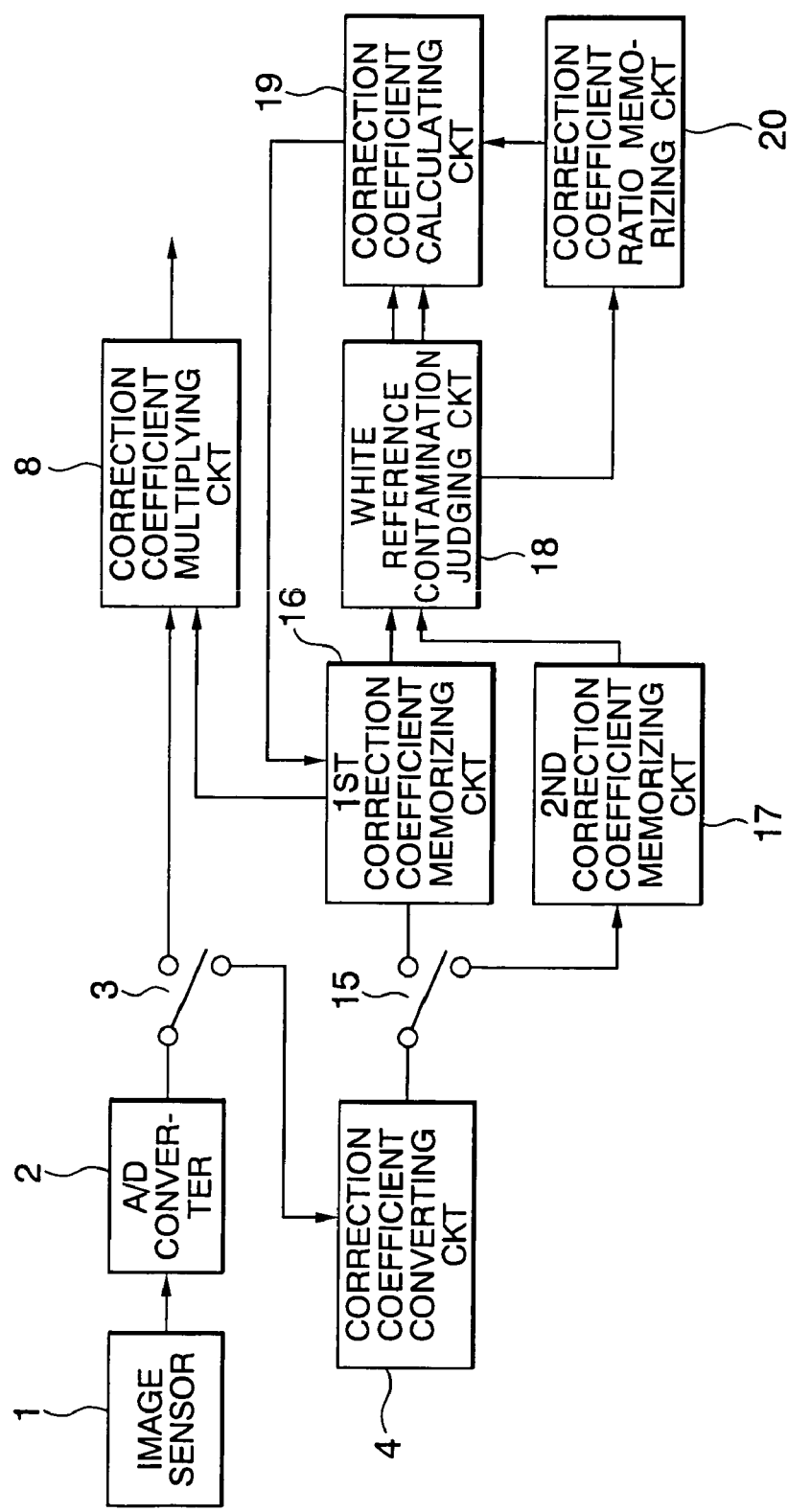
FIG. 1 is a block diagram of a conventional image reading apparatus.

Now, description will be made of this invention with reference to the drawing.

Figure 2:
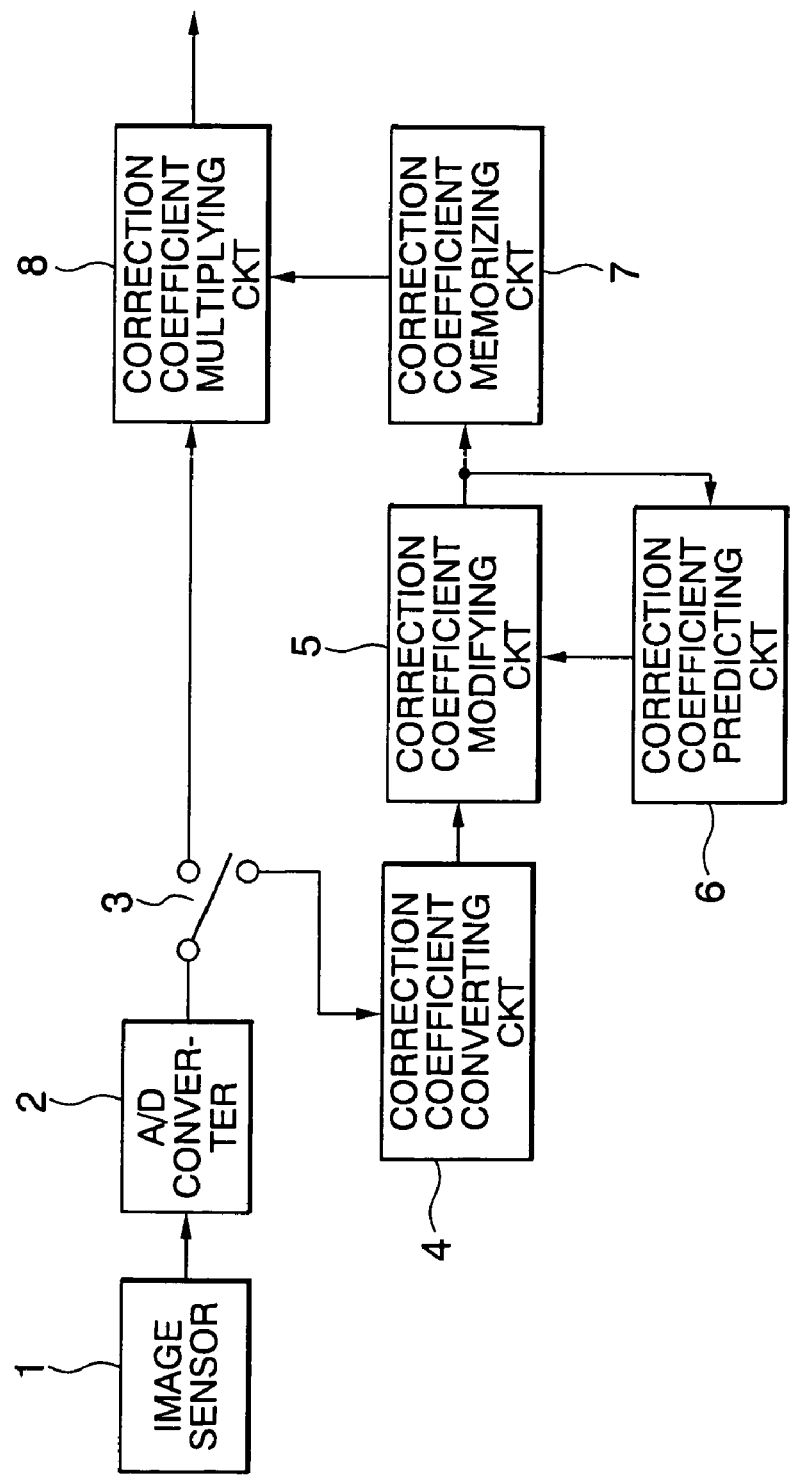
FIG. 2 is a block diagram of an image reading apparatus according to one embodiment of this invention.

Referring to FIG. 2, an image reading apparatus according to one embodiment of this invention comprises an image sensor 1 using a CCD (charge coupled device).

In a general-purpose scanner for a digital copying machine and a facsimile machine, use is made of a digital image reading apparatus having an optical system. In the optical system, a light beam from a light source irradiates an original image placed on a platen glass to produce a reflected light beam. The reflected light beam is turned by a mirror, travels through a lens, and forms an image on the CCD as an electrooptical converting device. This invention particularly relates to a shading function of correcting a reading level difference of each of a plurality of photo sensors, such as CCD chips, for reading the image.

Generally, the CCD is different in sensitivity pixel by pixel and is nonuniform in light distribution due to the light source for irradiating the original image and due to distortion of an image angle of the lens in the optical system. Therefore, in order to stably perform high-quality image reading in the image reading apparatus using the CCD, it is required to correct the reading level difference of each CCD chip. Therefore, in the image reading apparatus illustrated in FIG. 2 also, an image sensor 1 reads a white reference plate as a reference of image data before reading the original image. Specifically, the white reference plate is read in a linear fashion by the CCD chips arranged in a main scanning direction. The image sensor 1 produces a CCD output which is supplied to an A/D converter 2. The A/D converter 2 converts the CCD output into digital data and sends the digital data through a switch 3 to a correction coefficient converting circuit 4 as white reference data.

Supplied with the white reference data, the correction coefficient converting circuit (correction coefficient determining circuit) 4 determines a shading correction coefficient per each bit position corresponding to each CCD chip at each main scanning address.

Figure 3:
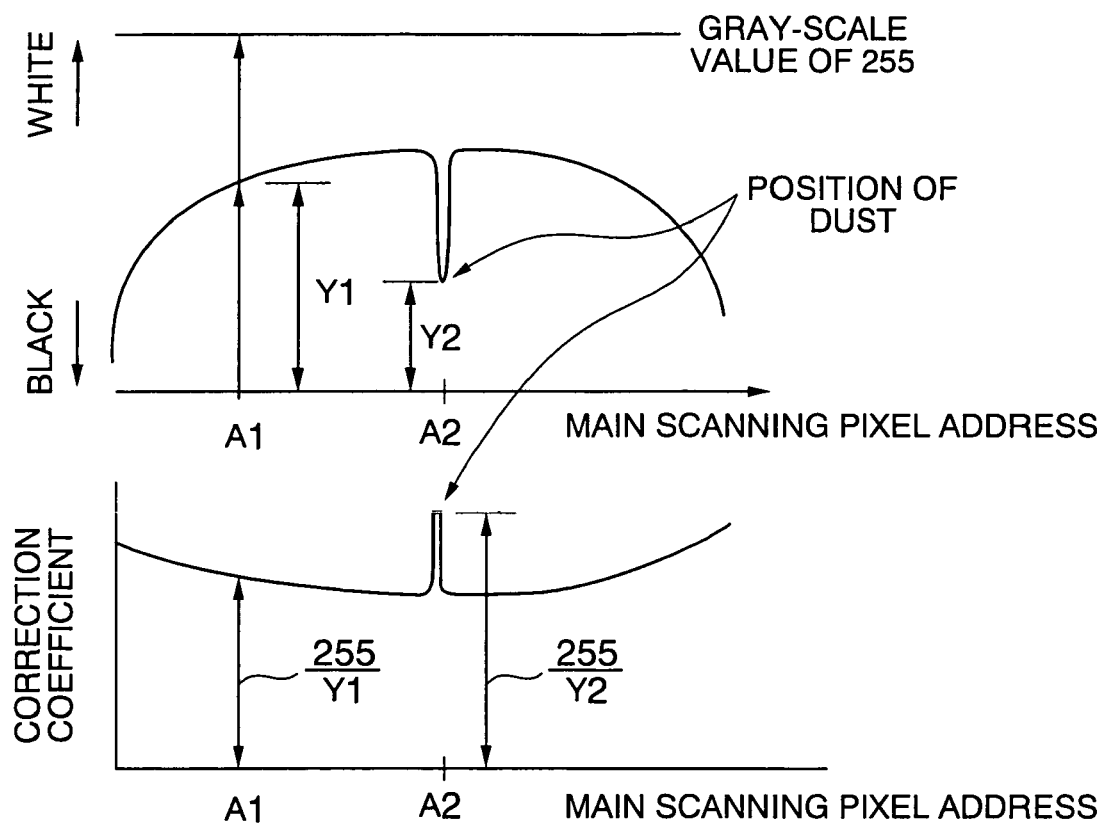
FIG. 3 is a view for describing an operation of the image reading apparatus illustrated in FIG. 2.

Referring to FIG. 3, description will be made of a function of the correction coefficient converting circuit 4. In FIG. 3, a shading waveform varies due to contamination of the white reference plate.

In FIG. 3, it is assumed that Y1 represents data at a main scanning pixel address A1. In case of gray-scale values of 255 levels, the shading correction coefficient is set to (255/Y1). In a later stage of reading the original image, data acquired at the main scanning pixel position A1 of the CCD chip of the image sensor 1 is multiplied by the correction coefficient (255/Y1). Therefore, it is possible to correct the variation, for example, the variation in sensitivity for each single pixel of the CCD and the nonuniformity in light distribution of the light source for irradiating the original image, throughout an entire length of a main scanning line.

Herein, description will be made of a case where dust or dirt is present at a reading position of the white reference plate when reading the white reference plate.

Referring to FIG. 3, in case where dust or dirt is present at a main scanning pixel position A2, data Y2 of a small level, which is different from the white reference data Y1 near to the gray scale value of 255, is acquired. Therefore, the shading correction coefficient is set to (255/Y2) which is greater than a normal value. In a later stage of reading the original image, data acquired at the main scanning pixel position A2 of the COD chip are multiplied by the correction coefficient (255/Y2) so that black information of the original image is set to high gray-scale data. Therefore, beyond a predetermined white/black threshold, the black information of the original image is incorrectly recognized as white to cause generation of a white fine.

In order to avoid the above-mentioned disadvantage, the image reading apparatus in FIG. 2 operates in the following manner. As described above, the correction coefficient converting circuit (correction coefficient determining circuit) 4 converts the white reference data of the white reference plate, which are read immediately before reading the original image, into a correction coefficient per each bit in the main scanning direction. The correction coefficient converting circuit 4 delivers the correction coefficient to a correction coefficient modifying circuit 5. Connected to an output of the correction coefficient modifying circuit 5, a correction coefficient predicting circuit 6 produces a predicted correction coefficient and delivers the predicted correction coefficient to the correction coefficient modifying circuit 5. Supplied with the correction coefficient and the predicted correction coefficient, the correction coefficient modifying circuit 5 produces the correction coefficient as a modified correction coefficient when an absolute value of the difference between the correction coefficient and the predicted correction coefficient is smaller than a predetermined threshold value and therefore no influence by dust or dirt is present.

On the other hand, the correction coefficient modifying circuit 5 produces the predicted correction coefficient as the modified correction coefficient when the absolute value of the difference between the correction coefficient and the predicted correction coefficient is not smaller than the predetermined threshold value and therefore the influence by dust or dirt is present. The correction coefficient predicting circuit 6 produces the predicted correction coefficient with reference to the modified correction coefficient. The predicted correction coefficient produced by the correction coefficient predicting circuit 6 is also supplied to the correction coefficient modifying circuit 5.

The modified correction coefficient produced by the correction coefficient modifying circuit 5 is memorized in a correction coefficient memorizing circuit 7 as shading correction coefficient data.

Upon reading the original image, the switch 3 supplies a correction coefficient multiplying circuit 8 with the digital image data produced by the A/D converter 2. The correction coefficient multiplying circuit 8 multiplies the digital image data by the shading correction coefficient data memorized in the correction coefficient memorizing circuit 7 to produce the result of multiplication as shading corrected image data.

Next, the operation of this embodiment will be described in detail.

In this invention, the image sensor 1 reads the white reference data of the white reference plate immediately before reading the original image. The correction coefficient converting circuit 4 converts the white reference data into the correction coefficient per each bit in the main scanning direction. It is assumed that the correction coefficient of an n-th bit (n being an integer not smaller than 0) is represented by PA(n). Next, the correction coefficient modifying circuit 5 modifies the correction coefficient to produce the modified correction coefficient. For example, the modified correction coefficient of the n-th bit is represented by PC(n). Then, the correction coefficient predicting circuit 6 produces the predicted correction coefficient PX(n+1) with reference to the modified correction coefficients PC(n), PC(n−1), PC(n−2), PC(n−3), . . . , and PC(n−i).

When n is smaller than i (n<i), the correction coefficient predicting circuit 6 produces PX(n+1)=PA(n+1) as the predicted correction coefficient The predicted correction coefficient produced by the correction coefficient predicting circuit 6 is also supplied to the correction coefficient modifying circuit 5.

Specifically, the white reference data at the white reference plate are converted by the correction coefficient converting circuit 4 into the correction coefficient PA(n). The correction coefficient PA(n) for an entire line (for example, from a first pixel to a 7500-th pixel) is supplied to the correction coefficient modifying circuit 5. The correction coefficient modifying circuit 5 modifies the correction coefficient PA(n) to produce the modified correction coefficient PC(n) for the entire line and supplies the modified correction coefficient PC(n) to the correction coefficient predicting circuit 6. The correction coefficient predicting circuit 6 produces the predicted correction coefficient PX(n+1) predicted from a series of the modified correction coefficients PC(n) and supplies the predicted correction coefficient PX(n+1) to the correction coefficient modifying circuit 5. The correction coefficient modifying circuit 5 compares the correction coefficient PA(n+1) and the predicted correction coefficient PX(n+1).

Herein, the difference between the correction coefficient PA(n+1) and the predicted correction coefficient PX(n+1) is compared with a predetermined threshold value K. If |PA(n+1)−PX(n+1)|<K, the difference between the correction coefficient PA(n+1) and the predicted correction coefficient PX(n+1) predicted from the modified correction coefficient PC(n) of an adjacent bit is small. This means that the (n+1)-th bit has no influence of dust or dirt. Therefore, the correction coefficient modifying circuit 5 selects the correction coefficient PA(n+1) as the modified correction coefficient PC(n+1) (PC(n+1)=PA(n+1)).

On the other hand, if |PA(n+1)−PX(n+1)|≧K is judged by the correction coefficient modifying circuit 5, the difference between the correction coefficient PA(n+1) and the predicted correction coefficient PX(n+1) predicted from the modified correction coefficient PC(n) of the adjacent bit is great. This means that the (n+1)-th bit has an influence of dust or dirt. Therefore, the correction coefficient modifying circuit s selects the predicted correction coefficient PX(n+1) as the modified correction coefficient PC(n+1) (PC(n+1)=PX(n+1)). In this manner, the correction coefficient of the bit with dust or dirt is excluded and replaced by the predicted correction coefficient predicted from the adjacent bit.

The modified correction coefficient thus determined is supplied to the correction coefficient memorizing circuit 7 as the shading correction coefficient data. Upon reading the original image, the correction coefficient multiplying circuit 8 is supplied with the digital image data produced by the A/D converter 2 and the shading correction coefficient data memorized in the correction coefficient memorizing circuit 7 and produces the shading corrected image data.

In order that the correction coefficient predicting circuit 6 predicts the predicted correction coefficient PX(n+1) with reference to the modified correction coefficients PC(n), PC(n−1), PC(n−2), PC(n−3), . . . , and PC(n−i), use may be made of linear approximation using the least square method. Alternatively, use may be made of another approximation, such as approximation using a predetermined quadratic curve.

The value of n must exceed the size of dust. For example, it is assumed that the dust on the white reference plate has a size of 500 μm while the CCD bit has a size of 7 μm. Taking into account the magnification of the optical system, a single bit on the white reference has a size of about 40 μm. Therefore, n=13 (=500/40) is sufficient.

If the image sensor 1 comprises the CCD with nonuniformity between even-numbered bits and odd-numbered bits, the correction coefficient predicting circuit 6 determines the predicted correction coefficient PX(n+1) with reference to the modified correction coefficients PC(n−1), PG(n−3), PC(n−5), PC(n−7), . . . , PC(n−(2i−1))

As described above, according to this invention, the correction coefficient converting circuit converts the white reference data of the white reference plate, which are read immediately before reading the original image, into the correction coefficient per each bit in the main scanning direction and sends the correction coefficient to the correction coefficient modifying circuit. Connected to the output of the correction coefficient modifying circuit, the correction coefficient predicting circuit produces the predicted correction coefficient and sends the predicted correction coefficient to the correction coefficient modifying circuit, Supplied with the correction coefficient and the predicted correction coefficient, the correction coefficient modifying circuit compares the difference between the correction coefficient and the predicted correction coefficient with the predetermined threshold value. If the difference is smaller than the threshold value and therefore no influence of dust or dirt is present, the correction coefficient modifying circuit produces the correction coefficient as the modified correction coefficient.

On the other hand, if the difference is not smaller than the threshold value and therefore the influence of dust or dirt is present, the correction coefficient modifying circuit produces the predicted correction coefficient as the modified correction coefficient. The correction coefficient predicting circuit produces the predicted correction coefficient with reference to the modified correction coefficient. The predicted correction coefficient produced by the correction coefficient predicting circuit is also supplied to the correction coefficient modifying circuit.

The modified correction coefficient produced by the correction coefficient modifying circuit is memorized in the correction coefficient memorizing circuit as the shading correction coefficient data.

Upon reading the original image, the digital image data produced by the A/D converter are sent to the correction coefficient multiplying circuit. The correction coefficient multiplying circuit multiplies the digital image data by the shading correction coefficient data memorized in the correction coefficient memorizing circuit and produces the result of multiplication as the shading corrected image data.

Thus, even if dust or dirt is present at the main scanning pixel position A2 as described in conjunction with FIG. 3, the correction coefficient (shading correction coefficient) is equal to or approximate to (255/Y1). Thus, the black information of the original image is not set to high gray-scale data. Therefore, the black information is not recognized as white beyond the predetermined white/black threshold value.

Accordingly, it is possible to prevent generation of a white line in the image.

In the shading correction circuit according to the first conventional technique mentioned above, the first correction coefficient is updated into a new value one after another by the use of a previous value of the first correction coefficient and the second correction coefficient obtained immediately before reading the original image. Therefore, the first conventional technique is disadvantageous in that, once an incorrect value is memorized due to signal noise or misjudgment upon the contamination of the white reference, the first correction coefficient is continuously updated into an incorrect new value thereafter. On the other hand, according to this invention, shading correction is carried out by providing means for analyzing a correction coefficient obtained immediately before reading an original image to detect dust or dirt on a white reference plate and modifying the correction coefficient, without using a previous correction coefficient.

Fine dust on the white reference plate is inevitable in its production process. If the resolution of the image reading apparatus is improved, such fine dust is read and manifested or expressed as a white line in image information. In this invention, however, the approximation accuracy of correction is improved as the dust becomes finer and finer. Therefore, the allowance of quality control in production of the white reference plate can be widened so that the production yield of the white reference plate can be improved.

What is claimed is:

1. An image reading apparatus comprising an image reader for reading an original image to produce digital image data, a correction coefficient memorizing circuit for memorizing shading correction coefficient data, and a correction coefficient multiplying circuit connected to said correction coefficient memorizing circuit for multiplying said digital image data by said shading correction coefficient data to produce a result of multiplication as shading corrected image data, said image reading apparatus further comprising:
    a correction coefficient determining circuit responsive to white reference data of a white reference plate read by said image reader before reading said original image for determining a correction coefficient per each bit of said white reference data in a bit array along a main scanning direction;
    a correction coefficient modifying circuit connected to said correction coefficient determining circuit for producing a modified correction coefficient; and
    a correction coefficient predicting circuit connected to said correction coefficient modifying circuit for producing a predicted correction coefficient with reference to said modified correction coefficient and sending said predicted correction coefficient to said correction coefficient modifying circuit;
    said correction coefficient modifying circuit being supplied with said correction coefficient and said predicted correction coefficient and producing said correction coefficient and said predicted correction coefficient as said modified correction coefficient when an absolute value of a difference between said correction coefficient and said predicted correction coefficient is smaller than and when said absolute value is not smaller than a predetermined threshold value, respectively;
    said correction coefficient memorizing circuit memorizing said modified correction coefficient as said shading correction coefficient data.

2. An image reading apparatus as claimed in claim 1, wherein:
    said correction coefficient predicting circuit obtains said predicted correction coefficient for a particular bit of said white reference data in the bit array along said main scanning direction with reference to at least a preceding adjacent bit preceding said particular bit in said main scanning direction.

3. An image reading apparatus as claimed in claim 1, wherein:
    said image reader comprises an image sensor and an AID converter connected to said image sensor.

4. A method of obtaining shading correction coefficient data in an image reading apparatus comprising an image reader for reading an original image to produce digital image data, a correction coefficient memorizing circuit for memorizing said shading correction coefficient data, and a correction coefficient multiplying circuit connected to said correction coefficient memorizing circuit for multiplying said digital image data by said shading correction coefficient data to produce a result of multiplication as shading corrected image data, said method comprising the steps of:
    a correction coefficient determining step of determining, in response to white reference data of a white reference plate read by said image reader before reading said original image, a correction coefficient per each bit of said white reference data in a bit array along a main scanning direction;
    a correction coefficient modifying step of receiving said correction coefficient and producing a modified correction coefficient; and
    a correction coefficient predicting step of producing a predicted correction coefficient with reference to said modified correction coefficient;
    said correction coefficient modifying step receiving said correction coefficient and said predicted correction coefficient and producing said correction coefficient and said predicted correction coefficient as said modified correction coefficient when an absolute value of a difference between said correction coefficient and said predicted correction coefficient is smaller than and when said absolute value is not smaller than a predetermined threshold value respectively;
    said method further comprising the step of making said correction coefficient memorizing circuit memorize said modified correction coefficient as said shading correction coefficient data.

5. A method as claimed in claim 4, wherein:
    said correction coefficient predicting step obtains said predicted correction coefficient for a particular bit of said white reference data in the bit array along said main scanning direction with reference to at least a preceding adjacent bit preceding said particular bit in said main scanning direction.

6. A method as claimed in claim 4, wherein:
    said image reader comprises an image sensor and an ND converter connected to said image sensor.

* * * * *